Figure 1:
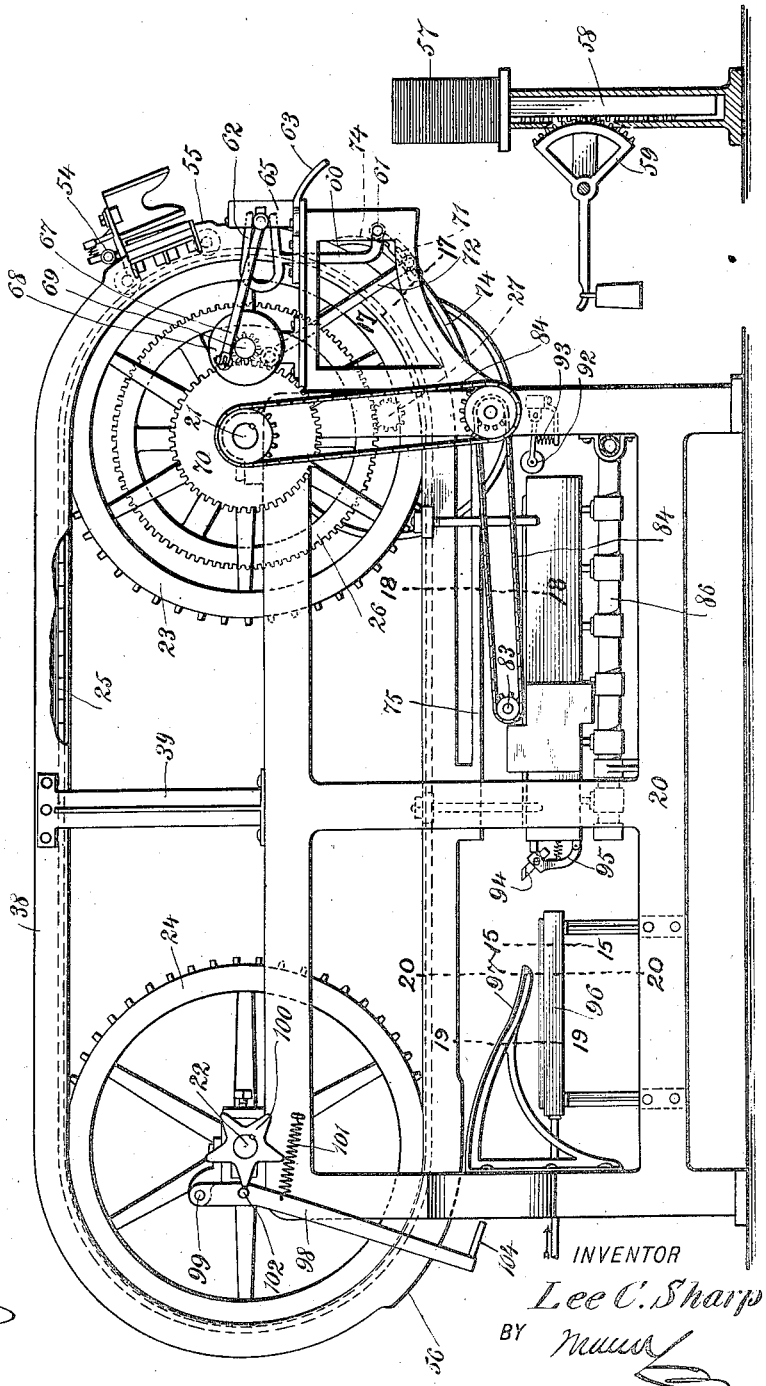

No. 812,955. PATENTED FEB. 20, 1906.
L. C. SHARP.
APPARATUS FOR FORMING AND SOLDERING CAN BODIES.
APPLICATION FILED JAN. 7, 1902.

7 SHEETS—SHEET 1.

WITNESSES:

INVENTOR
Lee C. Sharp
BY
ATTORNEYS

No. 812,955. PATENTED FEB. 20, 1906.
L. C. SHARP.
APPARATUS FOR FORMING AND SOLDERING CAN BODIES.
APPLICATION FILED JAN. 7, 1902.

7 SHEETS—SHEET 2.

WITNESSES:

INVENTOR
Lee C. Sharp
BY
ATTORNEYS

No. 812,955. PATENTED FEB. 20, 1906.
L. C. SHARP.
APPARATUS FOR FORMING AND SOLDERING CAN BODIES.
APPLICATION FILED JAN. 7, 1902.

7 SHEETS—SHEET 3.

WITNESSES:
INVENTOR
Lee C. Sharp
BY
ATTORNEYS

No. 812,955. PATENTED FEB. 20, 1906.
L. C. SHARP.
APPARATUS FOR FORMING AND SOLDERING CAN BODIES.
APPLICATION FILED JAN. 7, 1902.
7 SHEETS—SHEET 4.
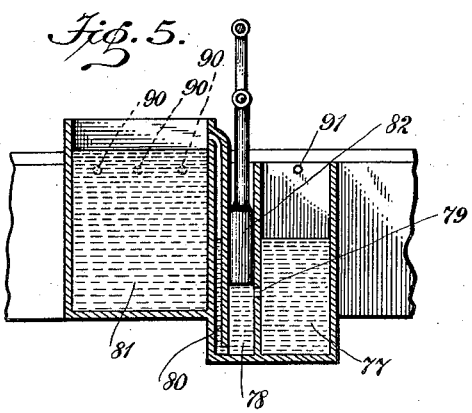
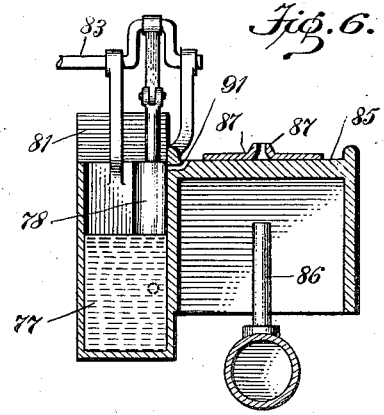
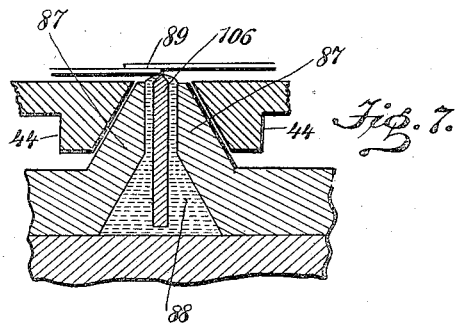
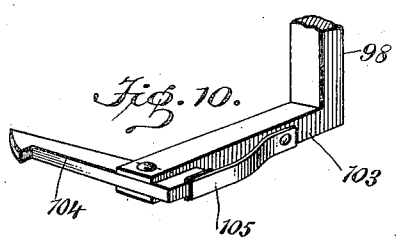
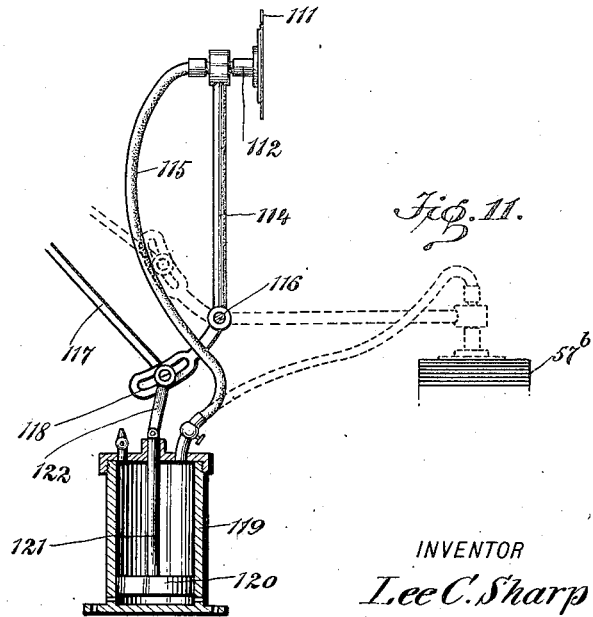
WITNESSES:
INVENTOR
Lee C. Sharp
BY
ATTORNEYS No. 812,955. PATENTED FEB. 20, 1906.
L. C. SHARP.
APPARATUS FOR FORMING AND SOLDERING CAN BODIES.
APPLICATION FILED JAN. 7, 1902.

7 SHEETS—SHEET 5.

WITNESSES:

INVENTOR
Lee C. Sharp
BY
ATTORNEYS

No. 812,955. PATENTED FEB. 20, 1906.
L. C. SHARP.
APPARATUS FOR FORMING AND SOLDERING CAN BODIES.
APPLICATION FILED JAN. 7, 1902.
7 SHEETS—SHEET 6.
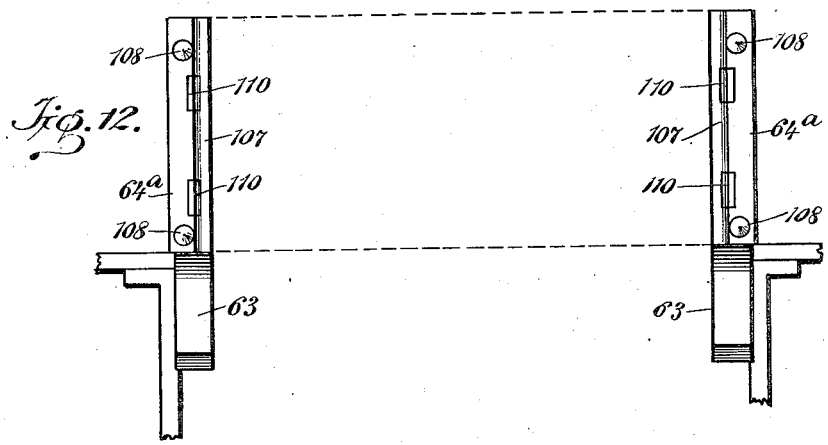
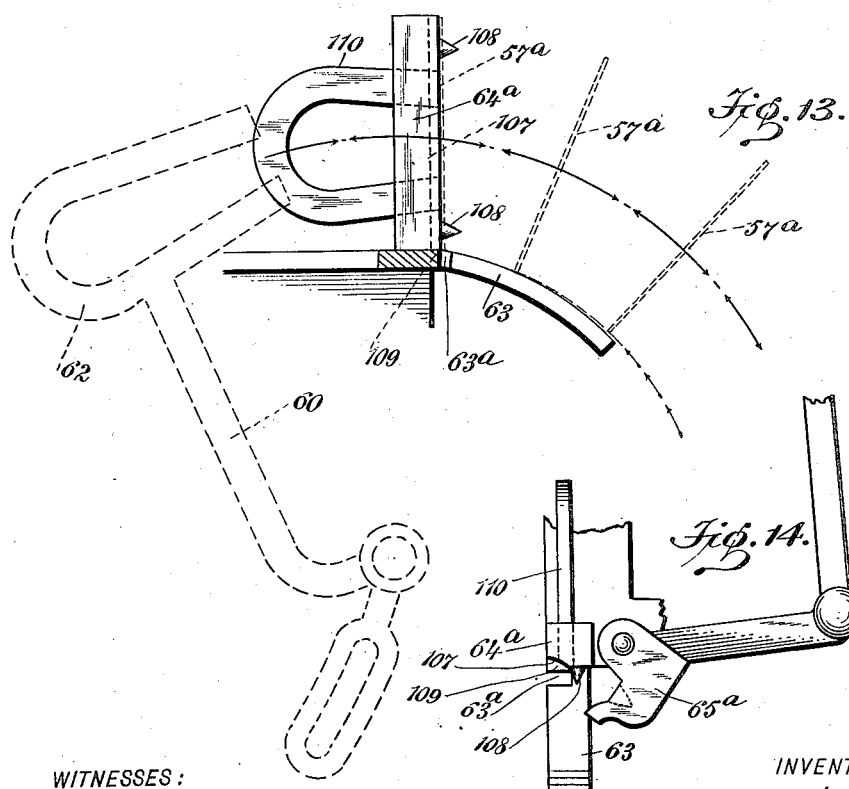
WITNESSES:
INVENTOR
Lee C. Sharp
BY
ATTORNEYS No. 812,955. PATENTED FEB. 20, 1906.
L. C. SHARP.
APPARATUS FOR FORMING AND SOLDERING CAN BODIES.
APPLICATION FILED JAN. 7, 1902.
7 SHEETS—SHEET 7.
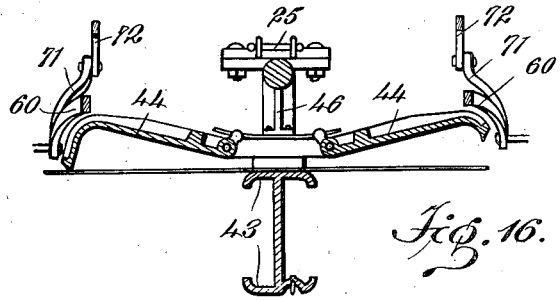
*Fig. 16.*
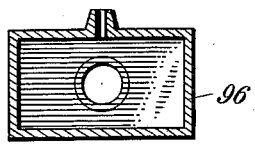
*Fig. 15.*
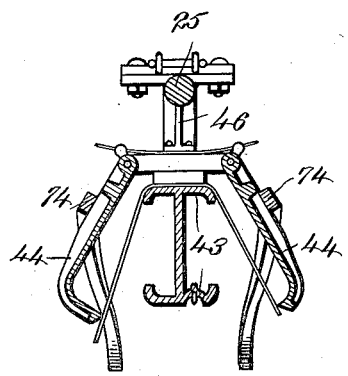
*Fig. 17.*
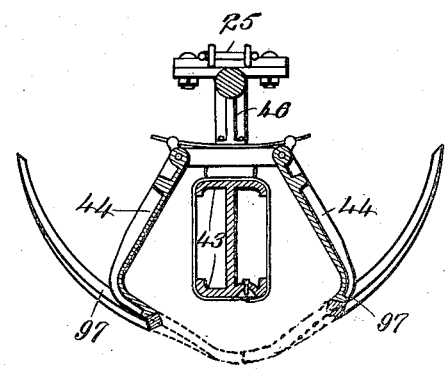
*Fig. 19.*
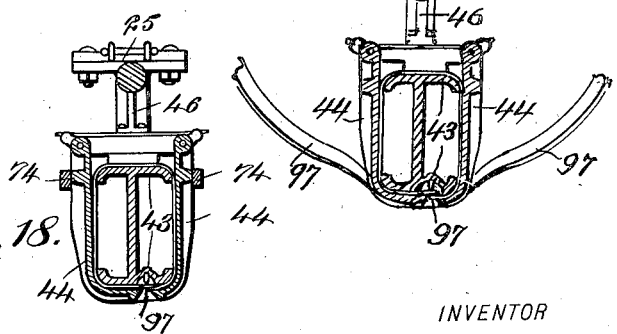
*Fig. 18.* *Fig. 20.*
WITNESSES:
A. R. Appleman Jr.
Isaac B. Owens.
INVENTOR
Lee C. Sharp
BY Munn & Co
ATTORNEYS.

UNITED STATES PATENT OFFICE.

LEE C. SHARP, OF OMAHA, NEBRASKA, ASSIGNOR TO AMERICAN CAN COMPANY, OF NEW YORK, N. Y., A CORPORATION OF NEW JERSEY.

APPARATUS FOR FORMING AND SOLDERING CAN-BODIES.

No. 812,955.      Specification of Letters Patent.      Patented Feb. 20, 1906.

Application filed January 7, 1902. Serial No. 88,775.

*To all whom it may concern:*

Be it known that I, LEE C. SHARP, a citizen of the United States, and a resident of Omaha, in the county of Douglas and State of Nebraska, have invented a new and Improved Apparatus for Forming and Soldering Can-Bodies, of which the following is a full, clear, and exact description.

The invention relates to machines in which a carrier or former is provided having folding wings and being adapted to engage a blank or sheet of tin or other metal and fold it into proper form, the carrier passing on to the soldering devices, which seal the seam, after which the can is ejected from the machine. In my invention the carrier moves continuously and without reversal throughout the entire operation of the machine, and the various steps performed by it do not involve the interruption of the movement of the carrier, thus making a fast machine.

The invention also involves peculiar means for automatically feeding the sheets or blanks of tin to the machine, thus dispensing with an operator to stand by the machine and steadily feed the blanks thereinto. The invention also involves various minor features of construction and combinations of parts, as will be fully pointed out hereinafter.

This specification is an exact description of one example of my invention, while the claims define the actual scope thereof.

Reference is to be had to the accompanying drawings, forming a part of this specification, in which similar characters of reference indicate corresponding parts in all the views.

Figure 2:
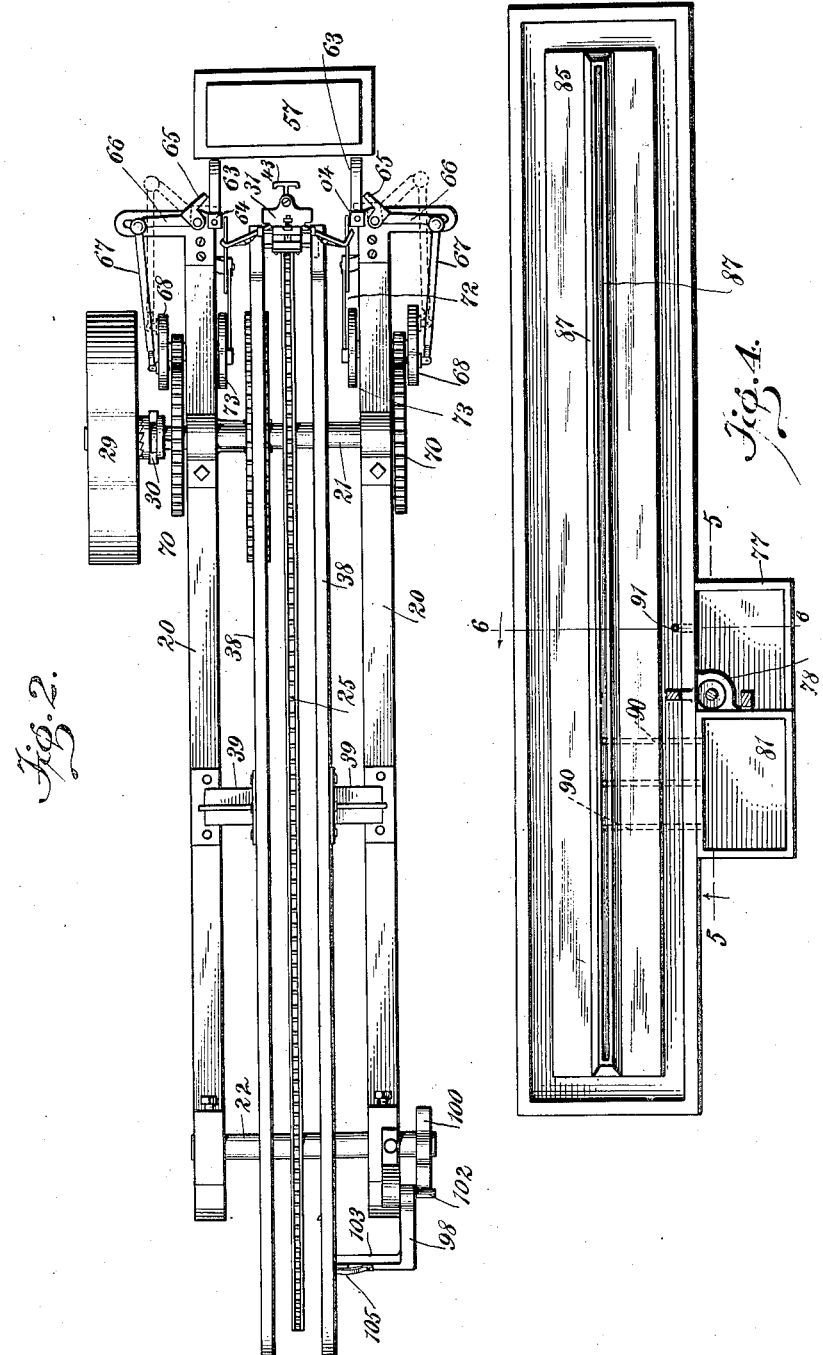
Figure 3:
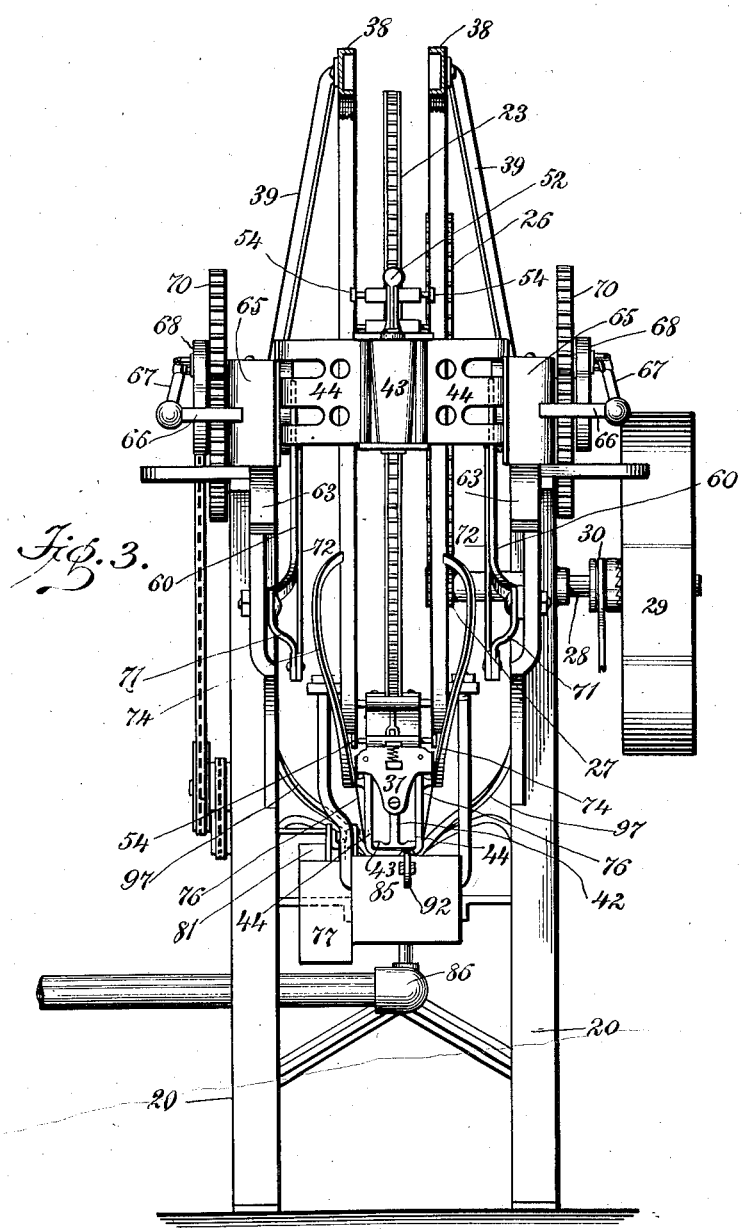
Figure 8:
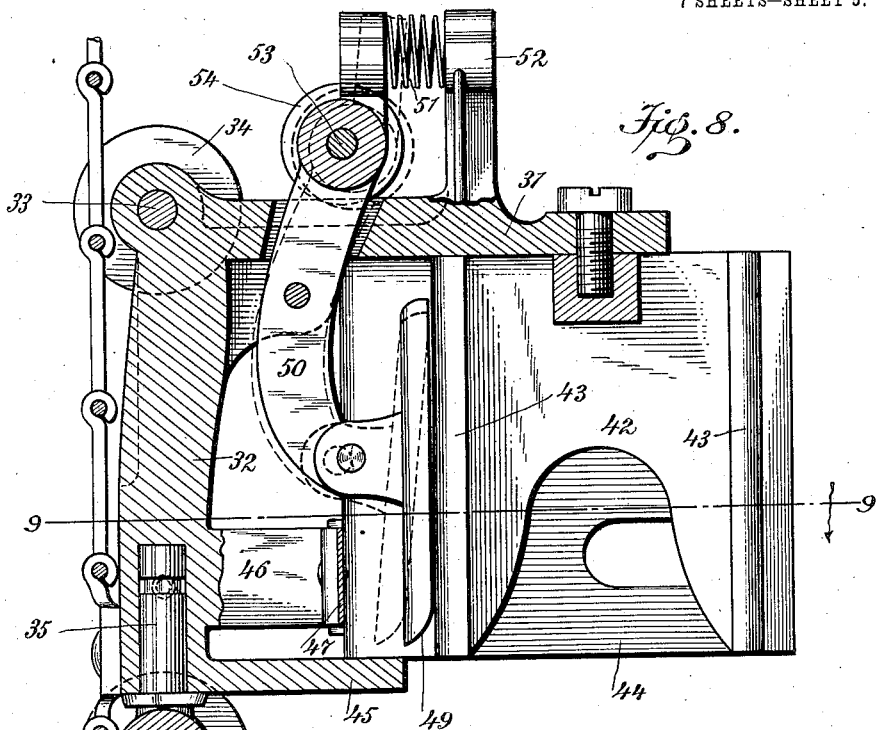
Figure 9:
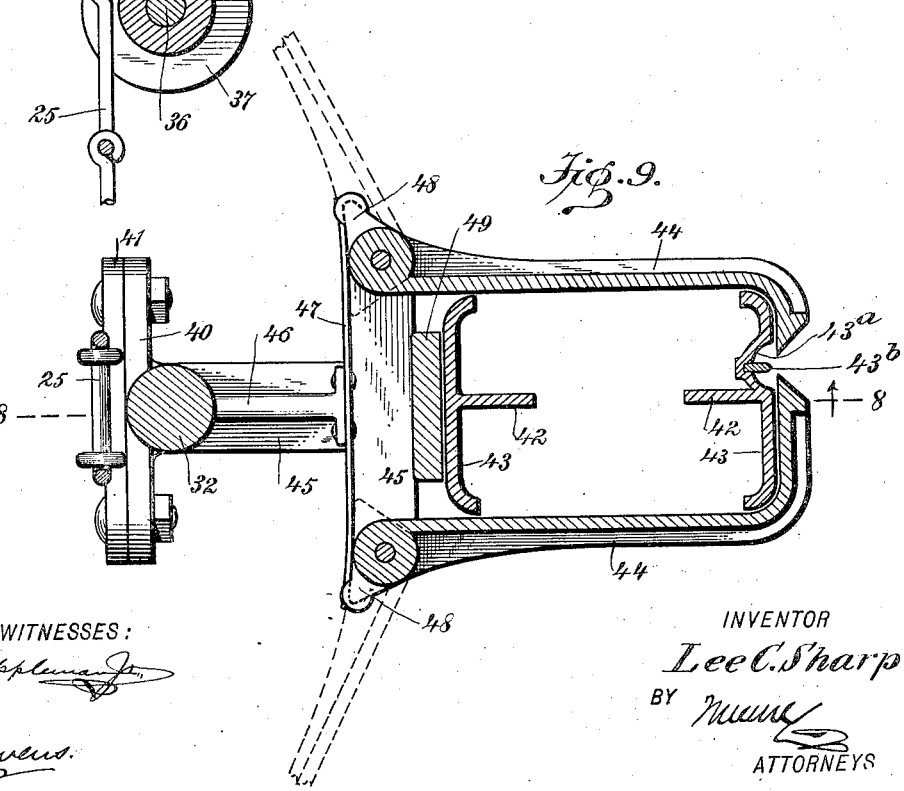

Figure 1 is a side elevation of the machine embodying my invention. Fig. 2 is a plan view of the same. Fig. 3 is a front end elevation showing parts broken away. Fig. 4 is an enlarged plan view of the soldering device. Fig. 5 is a section on the line 5 5 of Fig. 4. Fig. 6 is a section on the line 6 6 of Fig. 4. Fig. 7 is an enlarged cross-section of the solder-duct, showing the position of the can and the carrier-wings with respect thereto. Fig. 8 is a longitudinal section of the carrier on the line 8 8 of Fig. 9. Fig. 9 is a cross-section on the line 9 9 of Fig. 8. Fig. 10 is a detail view of the ejector. Fig. 11 is a view showing a modified form of the feed device. Figs. 12, 13, and 14 are detail views illustrating the device for receiving the blank tin from the feeding device and holding it until engaged by the carrier, these views also illustrating slight modifications in the said device whereby to crimp the ends of the can-blank, which operation is necessary in forming round can-bodies as contradistinguished from rectangular can-bodies. Fig. 15 is a section on the line 15 15 of Fig. 1. Fig. 16 is a fragmentary section showing the carrier-wings at the start of the closing movement. Fig. 17 is a section of the cam-tracks at the point 17 17, Fig. 1, showing the carrier-wings about half closed. Fig. 18 is a section of said tracks at the point 18 18, Fig. 1, showing the carrier-wings fully closed. Fig. 19 is a section of the wing-opening tracks at the point 19 19, Fig. 1, showing the carrier-wings half open; and Fig. 20 is a section showing the position of the carrier and its wings with respect to the opening-tracks at the point 20 20, Fig. 1.

The machine is adapted to form can-bodies of any cross-sectional shape desired, this depending upon the shape of the carrier. The carrier shown in the present drawings is adapted for forming a rectangular can. The machine is also capable of making lap or lock seams. The drawings show a lap-seam machine.

20 indicates the stationary framing of the apparatus, in the end portions of which are mounted, respectively, transverse shafts 21 and 22. The shafts are horizontal and carry sprocket-wheels 23 and 24, over which runs a chain 25, to which are attached the carriers, as will be fully described hereinafter. Fastened to the shaft 21 is a spur-gear 26, and this gear is meshed with a pinion 27 on the drive-shaft 28. The drive-shaft 28 has a band-pulley 29 and a clutch 30. (See Fig. 3.) Movement for driving the running parts of the machine is primarily applied to the shaft 28.

The carriers which receive and fold the tin into the form of the can-body and hold it during the soldering operation are illustrated in detail by Figs. 8 and 9. These carriers each comprise a back wall 31, which constitutes, essentially, the body of the carrier, these back walls standing at right angles to the direction of the run of the chain 25. At the inner end of the back wall 31 a longitudinally-extending bar 32 is located, and this bar carries at its rear end a transverse shaft 33, on the ends of which are mounted rollers 34. At the front end of the bar 32 is located a longitudinally-disposed stub-shaft 35, which is fitted to turn in the bar and carries a transverse shaft 36, on the ends of which are mounted rollers 37. These rollers 34 and 37 are arranged to run in endless angle-iron guides 38. (See Figs. 1, 2, and 3.) The guides 38 are two in number and arranged in parallelism so that the carriers may pass between them, the guides following the course of the chain 25. The guides 38 are rigidly sustained on the frame 20 by means of upwardly-projecting arms 39 and various other connections as may be convenient or desirable. The longitudinal bars 32 of the carriers have transverse extensions 40, (see Fig. 9,) which are fastened to transverse bars 41 on the chain 25, thus establishing connection between the carriers of the chain. In Figs. 1 and 2 I have only illustrated one carrier; but it will be understood that a number of these carriers will be provided in the operative machine, so that the work will be carried on as rapidly as possible. In Fig. 3 two carriers are shown. In practice the machine will be fitted with from twelve to eighteen carriers, spaced equidistant along the chain. The rollers 34 and 37 run in the guides 38, and these guides, therefore, cause the carriers to move in fixed paths, notwithstanding their connection with the chain at the single point of the bars 40 and 41. By arranging the shaft 35 to turn in the bar 32 of the carrier the carrier is allowed to accommodate itself to the movement of the chain. Formed integral with or rigidly fastened to the back or body plate 31 of each carrier is a web 42, this web extending longitudinally of the chain 25 and perpendicular to the plane thereof. (See Figs. 8 and 9.) At the inner and outer edges of the web 42 are located the rigid shaping-walls 43. These parts 43, held rigidly together by the web 42, form the mandrel around which the can-body is shaped. 44 indicates the folding or shaping wings, which are mounted to rock on axes parallel with the direction of the run of the chain 25 and are carried at their rear ends in the back or body plate 31, and at their forward ends in a T-shaped extension 45, projecting from the front end of the bar 32. These wings 44 are capable of being thrown out into the position indicated by dotted lines in Fig. 9 and of movement inward toward each other to lie snugly over the mandrel—i. e., the parts 43, as shown by full lines in Fig. 9. 46 indicates a stud projecting outwardly from the bar 32 and carrying a leaf-spring 47, which extends transversely of the chain 25 and has its end portions adapted to bear on eccentric projections 48, fastened to or formed integral with the wings 44 adjacent to the centers of their rocking movement. These springs serve to hold the wings 44 either in open or closed position, as the full and dotted lines in Fig. 9 indicate. The flat sheet or blank from which the can-body is formed is caused to be introduced into the carrier just inward of the inner shaping-wall 43 and to lie with its rear edge against the back wall 31. For holding this sheet during the folding and soldering operations I provide a gripper 49, which is carried on a lever 50, fulcrumed in the framing of the carrier and extending longitudinally of the chain. The rear end of the lever 50 projects through the rear plate 31 and is engaged by a spring 51, which bears between the lever and a rear extension 52 of the back plate 51. This spring is expansive and acts to keep the gripper 49 normally pressed against the inner shaping-wall 43. A transverse shaft 53 is carried by the rear portion of the lever 50, and on this shaft are mounted rollers 54. These rollers run on the outer surfaces of the channel-iron guides 38, (see Fig. 1,) and the arrangement of the parts is such that normally the spring 51 is allowed to act and keep the gripper in operative position. For the purpose of throwing open the gripper at the time that the can-blank is entered into the carrier and also at the time that the can-body is ejected therefrom, I form on the outer surfaces of the guides 38 enlargements or cam-like portions 55 and 46. As the rollers 54 run onto the cam-surfaces 55 and 56 they are thrown outward, and the spring 51 is compressed. This causes the gripper 49 to move inward, as indicated by the dotted lines in Fig. 8. When the carrier reaches the cam-surface 55 the gripper opens to permit the introduction of the tin sheet or blank, and when the carrier reaches the cam-surface 56 the gripper opens to permit the ejection of the can. With respect to the carrier thus constructed it will be observed that the actions of the parts are positively controlled and rendered certain and exact, and it will also be observed that the construction is such as to make the carrier as open and light as possible, thus not only reducing material and weight, but attaining a still more important object—namely, the susceptibility to quick heating and quick cooling, the heating being necessary during the time that the solder is applied to the seam, and the cooling being necessary during the period in which the solder is allowed to set.

The blanks or sheets of tin are indicated at 57 in Figs. 1 and 2. These blanks are supported in the position shown by means which will cause the top or uppermost blank of the pile to be always at the same height, thus allowing the automatic feeding device to properly engage the sheets. The means for keeping the pile of tin in this position may be any desired. For example, it may be the rack 58 and weighted sector 59. (Shown in Fig. 1.) As shown in Figs. 1, 2, and 3, the feeding device comprises two arms 60, which are located one at each side of the machine and mounted to swing around the centers 61 in Fig. 1. These arms are shown in their uppermost position in Fig. 1, and in their lowermost position they swing down into the level of the top sheet 57. Each arm 60 carries a magnet 62, which may be either of the permanent horseshoe type or an electromagnet. I prefer a permanent magnet, as shown in the drawings, and the strength of these magnets may be regulated by armatures placed at one point or another on the magnets, so as to cause them to accurately lift the sheets one at a time. The arms 60 are located at the sides of the machines and are spaced apart, so that the carriers may move between them, and these arms swinging simultaneously engage their magnets 62 with the respective end portions of the sheets of tin, and then as the arms return the sheets of tin are carried up, so as to lie in the path of the carrier and so that as the carriers move against the sheets the sheets will be entered accurately between the inner wall 43 and the gripper 49, which under the action of the cams 55 will then be in open position. As the sheet of tin is lifted by the magnets of the feed device its lower edge is caused to ride over forwardly and downwardly curved guide-arms 63, carried by the respective sides of the frame of the machine, and these guide-arms serve to justify the blank—that is to say, to cause it to assume the proper vertical position, so that it will be properly received in the carrier. The magnets raise the tin and engage it against vertical stops 64, (best shown in Fig. 2,) and simultaneously with this operation the edges of the sheet are engaged by clamps 65, which are one for each of the stops 64. As the clamps 65 engage the tin and hold it against the stops 64 the magnets 62 continue their movement to the left in Fig. 1, so that they will pass clear of the carrier and its wings and permit these parts to move uninterruptedly. The tin is thus held in accurate position for the engagement of the carrier therewith, and the instant that the carrier properly engages the tin and the gripper 49 returns to hold the tin in the carrier the clamps 65 are thrown back to their inactive position, and the tin is thus free to move on with the carrier. The clamps 65 have arms 66 attached thereto, and to these arms connecting-rods 67 have universal attachment by ball-and-socket joints. The connecting-rods 67 have universal connection with crank-disks 68, which are carried on stub-shafts 69, geared with spur-gears 70 on the shaft 21. By these devices 66, 67, 68, 69, and 70 the clamps 65 are given their proper movements. The arms 60 are driven in proper time by means of slotted extensions 71, connected therewith and having pitman-rods 72, joined thereto by means of pins running in the slots of the extension 71. These pitmen or connecting-rods 72 are driven from crank-disks 73, carried on the stub-shafts 69, before referred to. With respect to this feeding mechanism it will be observed that it is only necessary for the attendant to see that the proper supply of sheets is arranged on the supporting devices 58 and 59. In other respects the operation is entirely automatic, and owing to the thinness of the sheets a great number may be piled at once on the supporting device, and thus the machine will not require attention for considerable periods.

As the carrier moves downward from the position shown in Fig. 1 and engages the sheet of tin, the wings of the carrier are necessarily open in the position indicated by dotted lines in Fig. 9, and it now becomes necessary to close the wings so as to bend the tin and shape the can-body. When the arms 60 of the feeding device move upward and place the tin in position, they continue their upward movement, so as to clear the carriers, and then as the carriers engage the tin and move on with the same the arms 60 quickly resume their downward movement and overtake the carrier. The arms 60 then strike the outer sides of the wings 44 and start their inward or closing movement, after which the arms 60 and the carrier-wings move apart from each other, owing to the diverse paths along which they travel. This closing movement of the carrier-wings is finished by means of stationary guide-tracks 74. (See Figs. 1 and 3.) The guide-tracks 74 have their upper ends suitably supported on rigid portions of the machine. For example, they may be run inward and attached to the respective channel-iron guides 38, as indicated in Figs. 1 and 3. They then curve outwardly sufficiently apart so that the wings of the carriers may move between them, after which they converge (see Fig. 3) until they are sufficiently close to cause the carrier-wings to move fully to closed position as they pass between them. The carrier with its wings closed is shown in the lower part of Fig. 3. The upper part of Fig. 3 shows the carrier with its wings fully open and with the arm 60 back of its wings, so that as the arm 60 begins to move downward it will strike the wings and start their closing operation. If desired, the tracks 74 may be so arranged that the wings 44 of the carriers will run in between them when fully opened, and then these tracks 74 will wholly perform the closing operation, rendering the assistance of the arms 60 unnecessary. As the wings are moved into closed position they bend the tin up into the form of the can, and in the case of an angular can the edges of the tin or blank are lapped over each other, forming what is technically known as a "lapped seam." The carrier is formed with a groove $43^a$ running along the outer surface of the outer wall 43, and in the groove is placed an aluminium strip $43^b$. The parts are arranged so that the seam of the can comes directly over this groove and the strip 43ᵇ supports the seam. The purpose of this is to leave an air-space back of the seam in the can, and this facilitates the heating and cooling thereof. The can-body is now formed and is ready for the soldering operation, which will next be described.

As the carrier with its wings closed continues its movement it runs from the track 74 onto extensions 75 of said tracks. (See Fig. 1.) These extensions 75 are true continuations of the tracks 74, but they are arranged parallel to each other and at such distances apart that they will hold the wings 44 of the carrier tightly closed. The wings are provided on their outer sides with suitable guide-ribs for the engagement of the arms 60 and tracs k74 and 7c. These guide-ribs are indicated at 76 in Fig. 3 and may be of any form desired, their purpose being to furnish surfaces for the effective engagement of the parts mentioned, and also to strengthen the wings. The tracks 75 are located at the first half of the bottom run of the chain 25, and directly under these tracks are arranged the soldering devices.

The soldering devices comprising a pot 77, in which the solder is placed for melting and to which the overflow-solder returns to be remelted. This pot has a pump-cylinder 78 therein, (see Figs. 5 and 6,) such cylinder having a port 79 passing from the pot 77 and a duct 80 running to the main pot 81. The port 79 is located just below the limit of the upward stroke of the piston 82 of the pump-cylinder, and the duct 80 enters the cylinder 78 at the bottom thereof. The movement of the pump therefore causes the molten solder to be forced steadily from the pot 77 to the pot 81. The pump-piston 82 is driven by suitable connections from a crank-shaft 83, and this shaft in turn is driven (see Fig. 1) by chain-and-sprocket gearing 84 from the shaft 21. 85 indicates the soldering-table, beneath which are located the gas-burners or other heater 86. This table runs longitudinally of the machine under the lower run of the chain 25 and has formed thereon parallel ribs 87, which are spaced from each other to form a duct for the molten solder, which is indicated by the broken lines 88 in Fig. 7. This solder-duct runs approximately the entire length of the table 85 and is so arranged that the seam of the can will be moved directly over it. In Fig. 7, 89 indicates the lapped seam of the can. Reference to Figs. 7 and 9 will show that the free ends of the wings 44 of the carrier do not actually meet each other when closed, but leave a space between them. The parts are so adjusted that the seam in the can occurs directly in this space, (see Fig. 7,) and the wings have their free ends so formed that as the carrier moves over the soldering device the wings will ride their free edges along the ribs 87. This forms a close connection between the carrier and the solder-duct and causes the solder which rises in the duct, as will be hereinafter explained, to effectively engage the seam and work therein so as to seal it. The pot 81 communicates by passages 90 (see Figs. 4 and 5) with the solder-duct formed by the ribs 87, and as the solder is raised to the proper height in this pot it will fill the duct. The parts are so adjusted that the level of solder maintained in the pot 81 will be exactly equal to the plane in which the upper edges of the ribs 87 lie. Owing to the semifluid character of the molten solder, it will of itself run slightly above this level, and instead of lying in exactly the plane of the upper edges of the duct-ribs 87 it will arch up slightly above them, as indicated in Fig. 7. This insures an effective contact between the seam and the solder and causes the solder to be thoroughly applied to the seam. The solder which is spilled over the edges of the duct by the smearing action of the carrier passing over it will flow onto the table and return therefrom by a passage 91 into the pot 77. At the front end of the soldering-table 85 is located a roller 92, which is pressed up by a spring 93 and which lies directly in the path of the seam of the can. The can therefore runs its seam over this roller immediately prior to engaging the soldering devices, and the roller serves to flatten and compress the seam, placing it in proper form for the solder. 94 indicates a wiper which may be of any suitable form and which is carried on a spring-sustained arm 95 at the rear end of the soldering device. This wiper serves to remove superfluous solder from the seam, and owing to the application of the spring to the arm 95 the wiper acts with a jerking movement, and as the can leaves it tends to throw the superfluous solder back onto the soldering-table. It will be observed that the soldering operation is thus effected without interrupting the movement of the carrier and without dipping it into a bath. Owing to the relative arrangement of the parts 87 and 44, as illustrated in Fig. 7, the solder will be applied only to the seam and will not be smeared over the outer surface of the can. This arrangement very much simplifies the mechanism and reduces the resistance to driving the machine, since if the carrier track or guides were formed with a dip therein considerable power would be required to raise them from the dip after the soldering operation.

After the carrier moves from the soldering devices, the wings 44 run off of the tracks 75, and the carrier then passes to the cooling device and the devices for opening the wings and ejecting the finished can-body. These devices will now be described.

After the carrier with the can-body formed and soldered passes the brush 94 it moves onto a blower or cooler 96, (see Figs. 1 and 15,) which may be of any suitable form and which is arranged to emit a blast of air against the seam, thus cooling and setting the solder. Simultaneously with this operation the free ends of the wings at points immediately over the seam of the can-body are engaged by rails 97, which at their forward ends are close together and which gradually spread from each other, so that by the action of the carrier riding on these rails the wings are thrown from closed to open position. When this operation is ended, the rollers 54 run onto the cam-surfaces 56 of the guides 38, and the clamp 49 is then released. As the clamp is released the ejector acts and throws the can off of the mandrel—namely, the parts 43.

The ejector comprises an arm 98, which is arranged to swing around a center 99 and is actuated by a star-cam 100 on the shaft 22.

101 indicates a spring for returning the arm 98, the arm being thrown rearward by the action of cam 100 on a pin 102 on the arm.

The arm 98 is provided with a lateral extesion 103, (see Figs. 2 and 10,) this lateral extension carrying a dog 104, (see Figs. 1 and 10,) pivoted thereon and pressed by a spring 105. (See Fig. 10.) The dog 104 is arranged to strike the side of the can-body between the forming-walls 43, and this dog moves with the arm 98 in the same direction that the carrier is moving; but the movement of the dog is faster than the carrier, so that the dog overtakes the carrier and throws or "kicks," so to speak, the can therefrom. This completes the cycle of operations upon which the formation of the can-body depends, and after the can is ejected the carrier moves upward and forward with its wings open and returns to the position shown in Fig. 1, where the above-described operations are resumed.

If desired, a strip of copper (indicated at 106 in Fig. 7) may be loosely placed in the solder-duct. This copper strip lies longitudinally in the duct and preferably extends throughout the length thereof. Its width is but slightly less than that of the duct, and hence it cannot be displaced laterally to any material extent. The copper strip will be floated by the molten solder and will become highly heated by the heaters 86. As the strip of copper floats it engages the seam of the can, as Fig. 7 shows, and transmits heat thereto to facilitate the soldering operation. In short, this strip 106 performs the functions of a soldering-iron.

Figs 12, 13, and 14 illustrate certain details in the device for justifying and holding the blank sheets of tin. When square or angular cans are formed, it is not necessary to crimp the edges of the blank; but when round cans are formed it is necessary to crimp the blank, so as to cause the seam to lie snug.

The views above referred to show the stops 64ª formed with grooves 107, against which the end edges of the blank are adapted to lie. Working with these grooves are the clamps 65ª, which are formed with beads thereon arranged to match with the grooves 107, so that as these beads enter the grooves the edges of the sheets of tin will be crimped. The stops 64ª are provided with tapered pins 108 to engage the end edges of the sheet of tin and serve to guide the same into proper position with respect to the carrier. At the bottom ends of the stops rounding shoulders 109 are formed. These shoulders have the bottom edges of the tin rested thereon when the tin is in place, and they serve to sustain it, and owing to their rounding form as the tin is grasped by the carrier it may be readily pushed from the shoulders 109 and carried on with the movement of the carrier. 110 indicates permanent magnets, which are supported by the stops 64ª and which project through to the front sides thereof to engage the end portions of the sheets of tin, so as to hold them in place. As the magnets 62 of the feeding device move the tin against the stops 64ª the magnets 110 attract it, and then the magnets 62 leave the tin held by the magnets 110 and the parts 108 and 109. The justifier or guide-arms 63 are also shown in Figs. 12, 13, and 14, and in these views are clearly shown notches 63ª, which are formed in the guide-arms, so as to permit the passage of the tin laterally with respect to these arms. The tin indicated at 57ª in Figs. 12 and 13 rides over the upper surface of the arms and is justified thereby, and then when the carrier engages the tin the latter passes through the notches 63ª, and thus moves clear of the justifying-arms. With respect to the automatic feeding devices, it must be borne in mind that it is necessary to move the blank tin into position for engagement with the carrier with great accuracy, since it is essential for the proper operation of the parts that the tin be placed in the carrier so that the folding thereof will be effectively performed. Now as the feeding device moves up with the sheet of tin the lower edge of the tin is moved along the guide-arms 63, and the tin is thus caused to assume a true horizontal position. Its movement is then continued until it strikes the stops 64 or 64ª, as the case may be. The pins 108 act to guide the tin laterally and then the magnets 110 grasp the tin and hold it until the carrier arrives and takes it off. The form of tin or blank holding devices shown in Figs. 1, 2, and 3 may be used, if desired, for square cans, and the devices shown in Figs. 12, 13, and 14 may be used for either square or round cans. In either case I prefer the devices shown in Figs. 12, 13, and 14. If round cans are to be constructed, the clamps 65ª should be employed in connection with the stops 64ª, having the grooves 107; but if square cans are to be employed it is only necessary to provide the stops 64ª or 64 with the pins 108 and magnets 110, these parts working with the clamps 65 (shown in Fig. 2) and the arms 63 with the notches 63ª and shoulders 109. If lock-seam cans are to be made, the parts 64ª and 65ª should be modified accordingly.

If desired, the magnetic feeding device may be supplanted by a pneumatic or suction feed, such as shown in Fig. 11. This comprises a rubber disk 111, connected with a suction-head 112, which is yieldingly mounted in an arm 114 and connected to a flexible tube 115. The arm 114 swings around a center 116 and is driven by a link 117, working in a slotted extension 118 of the arm. The link 117 may be driven from the disk 68, before described, or from any other suitable device. 119 indicates a pump-cylinder, in which works a piston 120, connected to a rod 121, joined by a link 122 to the slotted extension 118 of the arm 114. The stack of tin or blanks is indicated at 57ᵇ in this view. (See Fig. 11.) The arm 114 swings from the position shown in full lines to that shown in dotted lines in Fig. 11. As the arm 114 moves down the piston 120 moves up and air is forced outward through the tube 115. As the arm 114 moves back to its raised position the piston 120 moves down and air is drawn into the tube 115. This inward draft of air creates a suction at the head 112, and a plate or sheet of tin is raised with the arm. The suction-head 112 has a yielding movement in the arm 114, and this enables a return movement of the arm and the starting of the suction action to begin before the head itself begins to return. By this arrangement I insure that a proper sucking action is exerted on the top sheet of tin before the returning movement of the suction-head is actually begun. This renders the operation of the device absolutely certain.

The general operation of the apparatus may be traced as follows: Referring to Fig. 1, the pile of blanks 57 being in place on the holder 58 59 and the movement of the drive-shaft 28 started, the chain 25 will turn and the stub-shafts 69 will be driven. The feed device will move downward and lift a sheet of tin into the holding device, and then a carrier with its wings open will approach and engage a sheet of the tin, the back plate 31 of the carrier striking the upper edge of the sheet of tin, so as to justify its position in the carrier. The carrier continuing its movement carries the sheet of tin downward, and the arms 60, operating to grasp a second sheet of tin, strike the wings of the carrier and start their closing movement. (See Fig. 16.) This movement is continued by the engagement of the carrier-wings with the tracks 74, (see Fig. 17,) which causes the wings to close and assume the position shown by the lower part of Fig. 3 and in Fig. 8. The tin being thus bent and shaped on the mandrel— namely, the parts 43—has now formed the can-body, and the carrier moves onto the soldering device, where the solder is applied. After the application of the solder the carrier passes over the blowing apparatus 96, and then upon engagement with the tracks 97 (see Fig. 19) the wings are thrown open. Finally the ejector goes into operation and the can is kicked off of the carrier, after which the carrier passes upward and forward and the above-described operation is repeated.

Various changes in the form, details, and minor features of the organism above described may be resorted to at will without departing from the spirit of my invention. Hence I consider myself entitled to all organisms lying within the terms or intent of my claims.

Having thus described my invention, I claim as new and desire to secure by Letters Patent—

1. A can-forming machine having a carrier with means for bending the blank to form the can, said carrier being mounted to move uninterruptedly throughout the operation of the machine, blank-holding devices past which the carrier moves to take the blank, means for automatically feeding the blanks to the blank-holder, soldering devices past which the carrier moves, an ejector mounted independently of the carrier, and gearing for driving the ejector faster than the carrier and in the direction of movement thereof to throw the can off the carrier.

2. In a can-forming machine, the carrier having a back or body wall in position to be engaged by the can-blank, a mandrel carried rigidly thereby, and folding wings mounted to move over the mandrel.

3. In a can-forming machine, the carrier having a back or body wall, a mandrel carried thereby, folding wings mounted to move over the mandrel, a longitudinally-extending bar fastened to the back plate, and means projecting from the bar, on which means and the back plate the wings are pivoted.

4. The combination of the chain and carrier, the carrier being fastened to the chain, a wheel mounted on the carrier, a second wheel, a shaft on which the second wheel is carried, and a stub-shaft carrying the other shaft and mounted to turn in the carrier.

5. The combination of the chain and carrier, the carrier being fastened to the chain, a wheel mounted on the carrier, a second wheel, a shaft on which the second wheel is carried, and a stub-shaft carrying the other shaft and mounted to turn in the carrier, the stub-shaft extending longitudinally of the chain.

6. In a can-forming machine, the combination with the automatic feed, of the holder receiving the blank tin from the feed, and including tapering pins between which the tin is moved to justify it.

7. In a can-forming machine, the combination with the automatic feed, of the stops between which the feed passes and against which the blank tin is moved, and the outwardly and downwardly curved justifying-arms leading to the stops and notched at points adjacent thereto, for the purpose specified.

8. In a can-forming machine, the solder device, comprising a relatively narrow solder-duct lying longitudinally in the path of the can-carrier, means for supplying solder to the duct, and a metallic strip lying loosely and freely movable in the duct, and floated by the solder therein for the purpose specified.

9. In a can-forming machine, the combination with the automatic feed, of stops between which the feed moves and against which the blank tin is placed, and a clamp working with each stop to clamp the tin thereon.

10. The combination, with a carrier mounted to move through the machine, and comprising folding wings adapted to bend and form the blank, and also comprising means for releasably holding the wings either in open or closed position, of stationary tracks past which the carrier runs to open and close the wings, the tracks for opening the wings being divergent and having their near edges adapted to enter between the contiguous ends of the wings so that the wings will ride along said divergent tracks to spread the wings apart and means for driving the carrier.

11. The combination of moving carrier having wings for bending the blank and also having means for releasably holding the wings either in open or closed position, converging rails along which the wings move to close them, diverging rails along which the wings move to open them, the divergent rails having their near edges adapted to enter between the contiguous ends of the wings so that as the wings ride on said rails the wings are spread apart and means for driving the carrier.

12. In can-forming machine, the combination of the carrier comprising the body part, the mandrel carried thereby, the wings arranged to fold over the mandrel, a gripper coacting with the mandrel, a lever adapted to be actuated to release the gripper, and a spring pressing on the lever to hold the gripper normally in active position, means for moving the carrier through the machine, and means for operating said lever.

13. In a can-forming machine, the carrier comprising the combination with the body part, the mandrel carried thereby and the wings arranged to fold over the mandrel, of a gripper coacting with the mandrel, a lever adapted to be actuated to release the gripper, a spring pressing on the lever to hold the gripper normally in active position, and a roller carried on an axis transverse to the length of the lever, for imparting movement to the lever contrary to the spring.

14. In a can-forming machine, the carrier having the body portion, the mandrel, the wings arranged to fold over the mandrel, said wings having eccentric projections adjacent to their pivoted ends, and a spring bearing on said eccentric projections and serving to hold the wings releasably either in open or closed position.

15. The combination of the chain and carrier, the carrier being fastened to the chain, two members carried by the carrier and adapted to run on a guiding-track, and means for mounting one of said members to swing around an axis essentially longitudinal of the chain, said means comprising a shaft transverse to the chain and a stub-shaft carrying the first-named shaft and mounted to turn in the carrier longitudinally of the chain.

16. In a can-forming machine, the combination with the means for forming and soldering the can, of the automatic feeding device comprising a swinging arm, a suction-head carried thereby for grasping the blank tin, a pump, an operating connection between the swinging arm and the pump to operate the latter, and gearing connecting the swinging arm with the means for forming and soldering the can.

17. The combination of a swinging arm, a suction-head carried thereby, a pump-cylinder having connection with the suction-head, a pump-piston, an operating connection between the swinging arm and the pump-piston, and means for driving the swinging arm.

18. The combination of a suction-head, means for movably mounting the same, a pump, a pneumatic connection between the pump and suction-head, a mechanical connection between the suction-head and pump to operate the two in unison, and means for driving said parts.

19. In a can-forming machine, the combination with the automatic feed, of the stops between which the feed passes and against which the blank tin is moved, and the outwardly and downwardly curved justifying-arms leading to the stops.

20. In a can-forming machine, the soldering device comprising means forming a solder-duct adapted to have the can moved over it to supply solder to the seams, and a metallic strip placed loosely and freely movable in said duct whereby to be floated by the solder therein, for the purpose specified.

21. In a can-forming machine, the combination of a moving carrier adapted to form the can, stationary means for holding the blanks in the path of the carrier so that the carrier may engage the blanks, an operative member movable to, and from said holding means, automatically to deposit the blank in the said holding means, and gearing for driving the carrier and the said operative member continuously and in unison.

22. In a can-forming machine, the combination of a moving carrier adapted to form the can, stationary means for holding the blanks in position to be engaged by the carrier, a swinging arm having a gripping device to engage the blanks, said arm swinging to said means for holding the blanks and serving to move the blanks into the said means, and gearing for driving the carrier and arm continuously and in unison.

23. In a can-forming machine, the combination of a carrier adapted to fold the blank to form the can, means for holding the blank in the path of the carrier, a swinging arm arranged to feed the blanks to said holding means, a curved justifying-arm along which the blank is moved in its passage to said blank-holding means, and gearing for operating the said arm and carrier continuously and in unison.

24. In a can-forming machine, the combination of a moving carrier adapted to fold the blank to form the can, means for holding a stack of blanks, means for holding a blank in the path of the carrier to permit the carrier to engage the blank, an operative member movable between the means for holding the pile of blanks and the means for holding the blank in the path of the carrier and serving individually to transfer the blanks from the stack to the means for holding the blanks in the path of the carrier, and gearing for driving the carrier and said operative member continuously and in unison.

25. In a can-forming machine, the combination with the carrier for folding the blank to form the can, of means for feeding the blanks, a blank-holder receiving the blanks from the feeder, said blank-holder including an operating-gripper, and gearing for driving the carrier, the feeding means and the said gripper, continuously and in unison.

26. In a can-forming machine, the combination with the mechanical feeding means, of stops between which the feed moves and against which the blank tin is placed, a clamping or gripping device working against the stops, and means for operating said clamping or gripping device and the feeding means continuously and in unison with each other.

27. In a can-forming machine, the combination of a swinging arm having a gripping device at its free end to engage the blank tin, a stationary blank-holder, and a stationary justifying-arm projecting outward from the stationary blank-holder and following the arc of movement of the swinging arm, whereby to have the edge of the blank move along the justifying-arm as the blank is advanced to the holder, for the purpose specified.

28. In a can-forming machine, the combination of a swinging arm having a gripping device at its free end to engage the blank tin, a blank-holder, and a justifying-arm projecting from the blank-holder and adapted to have the edge of the blank move along the same as it advances to the holder, for the purpose specified, and the said justifying-arm being curved in an arc slightly eccentric to the center of the swinging movement of the arm.

29. In a can-forming machine, the combination with the carrier having the means for shaping the blank to form the can, of a blank-holder adapted to hold the blank in the path of the carrier to be engaged thereby, said blank-holder including a magnet to attract the tin.

30. In a can-forming machine, the combination with the carrier having the means for shaping the can-body, of a blank-holder adapted to receive the blank and hold the same in the path of the carrier, said holder including tapered pins between which the tin is moved to justify it.

31. In a can-soldering machine, the combination of a carrier, comprising the mandrel and the folding wings, the latter having their opposite edges separated to expose the seam in the can, a soldering device over which the carrier runs, said device comprising ribs forming a duct adapted to be received between the said opposite edges of the carrier folding wings, and means for supplying said duct with molten solder.

32. In a can-soldering machine, the combination of a carrier, comprising the mandrel and the folding wings, the latter having their opposite edges separated to expose the seam in the can, a soldering device over which the carrier runs, said device comprising ribs forming a duct adapted to be received between the said opposite edges of the carrier folding wings, and means for supplying said duct with molten solder, said duct having a continuous opening or slot in its upper portion through which the solder passes.

33. In a can-soldering machine, the combination of a carrier, comprising the mandrel and the folding wings, the latter having their opposite edges separated to expose the seam in the can, a soldering device over which the carrier runs, said device comprising ribs forming a duct adapted to be received between the said opposite edges of the carrier folding wings, means for supplying said duct with molten solder, and a metallic strip placed loosely and freely movable within the duct and adapted to be floated by the solder therein, whereby said strip bears upon the seam, for the purpose specified.

34. In a can-forming machine, the combination with the soldering means of the carrier mounted to move past the soldering means and comprising a mandrel and means for folding the can-blank over the mandrel, said mandrel having a groove formed therein and the groove being positioned to lie directly adjacent to the seam in the can whereby to provide an air-space back of the seam to permit rapid cooling of the solder.

35. In a can-forming machine, the carrier comprising a mandrel and means for folding the can-blank over the mandrel, said mandrel having a groove formed therein and the groove being positioned to lie under the seam in the can, whereby to provide an air-space back of the seam to permit the rapid cooling of the solder, and a supporting-strip extending longitudinally through the said groove, and adapted to engage the seamed part of the can to support the same against external pressure.

36. In a can-forming machine, the carrier, comprising the body portion, the mandrel supported thereon, the means for folding the blank over the mandrel, a gripper working against the mandrel to hold the blank, an intermediately-fulcrumed lever with which one end of the gripper is pivotally connected, and means working with the other end of the lever automatically to operate the same.

37. In a can-forming machine, the moving carrier comprising a body, a mandrel supported thereon, means mounted on the body for folding the blank over the mandrel, a gripper coacting with the mandrel, for the purpose specified, means having connection with the gripper to mount the same, a spring pressing the gripper into action, a laterally-projecting part connected with the gripper and an inclined track adapted to be engaged by said part to release the gripper.

38. In a can-forming machine, the carrier comprising the body portion, the mandrel, the folding wings, and a spring coacting with the wings and serving yieldingly to hold the wings either in open or closed position.

39. In a can-forming machine, the carrier comprising the body portion, the mandrel, the folding wings coacting with the mandrel and having extensions projected from the pivoted portions of the wings, and a spring fastened to the body intermediate its ends and having its ends respectively bearing against the said projections, for the purpose specified.

40. In a can-forming machine, the combination of the carrier comprising the folding wings, means for mounting the carrier to move through the machine, converging rails adapted to be engaged by the wings, whereby to close the wings, the said wings having their opposing ends spaced apart, and diverging rails adapted to be entered between said ends of the wings, whereby to throw the wings into open position.

41. In a can-forming machine, the combination with the carrier moving continuously and uninterruptedly throughout the operation of the machine, of a lever mounted independently of the carrier and past which the carrier moves, a dog on the lever, to engage the can and throw it off of the carrier, and means for operating the lever, said lever moving in the same direction that the carrier moves, but faster than the movement of the carrier, whereby to overtake and eject the can.

42. The combination of a swinging arm, a suction-head carried thereby, a pump, a pneumatic connection between the pump and suction-head, a slotted arm connected with the swinging arm, a link having connection with the pump-piston, and with the slotted arm, and means for imparting a swinging movement to the slotted arm.

43. In a can-forming machine, the combination of the chain, the carrier attached thereto, and the endless guides or tracks on which the carrier is adapted to run, the carrier having two members running on said guides or tracks to mount the carrier, and the carrier also having means for mounting one of said members to swing or rock on the carrier around an axis essentially longitudinal of the chain and central with respect to the carrier.

44. In a can-forming machine, the combination of a chain, a carrier attached thereto and the endless guides or tracks on which the carrier is adapted to run, the carrier having two members running on said guides or tracks to mount the carrier, and the carrier also having means for mounting one of said members to swing on the carrier around an axis essentially longitudinal of the chain.

In testimony whereof I have signed my name to this specification in the presence of two subscribing witnesses.

LEE C. SHARP.

Witnesses:
   I. B. OWENS,
   JNO. M. RITTER.